E. H. JONES.
CASING FOR PNEUMATIC TIRES.
APPLICATION FILED MAR. 15, 1912.

1,133,153.

Patented Mar. 23, 1915.
2 SHEETS—SHEET 1.

E. H. JONES.
CASING FOR PNEUMATIC TIRES.
APPLICATION FILED MAR. 15, 1912.
1,133,153.
Patented Mar. 23, 1915.
2 SHEETS—SHEET 2.
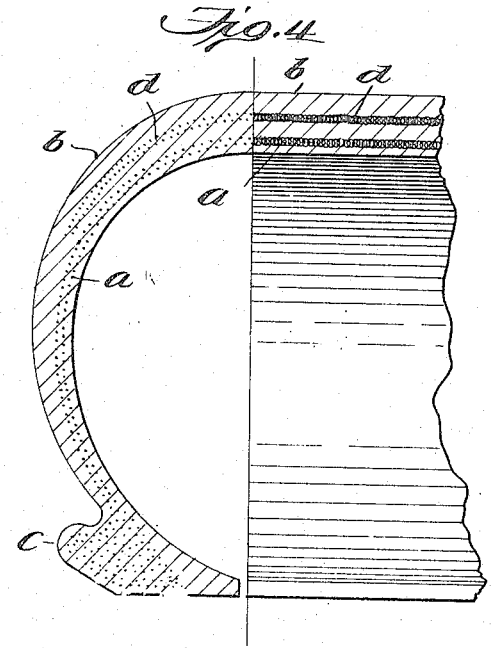
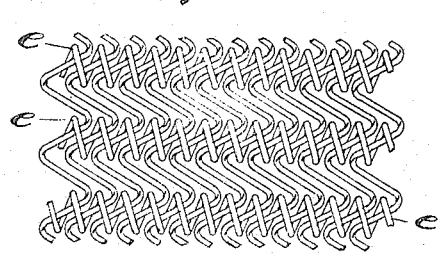
Witnesses:
Inventor
Ernest H. Jones

UNITED STATES PATENT OFFICE.

ERNEST HENRY JONES, OF LONDON, ENGLAND.

CASING FOR PNEUMATIC TIRES.

1,133,153.   Specification of Letters Patent.   Patented Mar. 23, 1915.

Application filed March 15, 1912. Serial No. 683,936.

*To all whom it may concern:*

Be it known that I, ERNEST HENRY JONES, engineer, subject of the King of Great Britain, residing at The Motor House, 318 Euston road, London, England, have invented certain new and useful Improvements in Casings for Pneumatic Tires, of which the following is a specification.

This invention relates to what are known as the "outer covers" of pneumatic tires, and particularly to such as are intended for use on motor cars and motor cycles.

To obtain the best results from the resiliency of the air, a pneumatic tire in use should be capable of "swallowing" obstacles such as small stones, met with upon the road, without flattening the tread, and an ideal tire would be formed of an ordinary pure rubber inner tube if such could be used by itself. Obviously, such a tire could not sustain anything approximate to the internal air pressure required, but the example merely serves to illustrate what is necessary.

This invention has for its object, improvements based upon the use of an elastic metal casing or restraining element which may consist of a fabric formed of a number of interwoven or interlaced coils of spring wire arranged in such a manner with respect to the tire or cover, that the outer cover will be extensible within predetermined limits and will vary in diameter according to the internal air pressure; such a tire must obviously be constructed, in order to obtain the best results, of a certain strength of spring material to sustain a certain pressure, as the best result would not be achieved if the springs were not tensioned sufficiently; neither would so good a result be obtained if the springs were stretched to too great an extent and there is a point midway between the two extremes when the spring material may be stated to be in "equilibrium" and in such a condition the complete tire would contract and expand freely in use.

Figure 1:
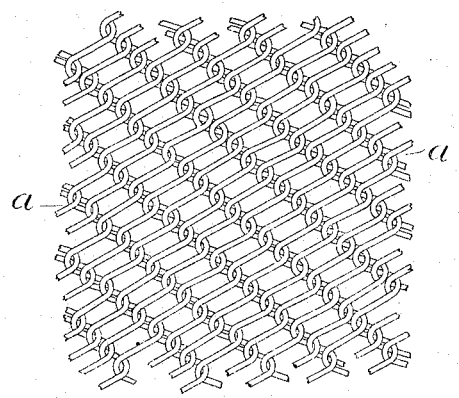
Figure 2:
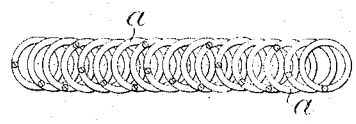
Figure 3:
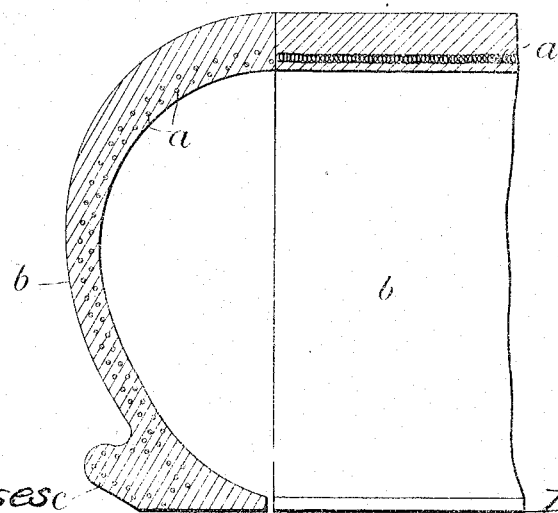

In accompanying drawings Figure 1 is an elevation drawn to an enlarged scale of a piece of fabric composed of interwoven or interlaced coils of spring wire stretched to its full limit, and showing a multiple interweaving. Fig. 2 is an end view. Fig. 3 is a compound cross-sectional and longitudinal sectional view of an outer cover constructed according to the invention. Fig. 4 is a view similar to Fig. 3 but showing a modification of the invention. Fig. 5 is a view similar to Fig. 1 of a further modification. Fig. 6 is an end view of Fig. 5.

According to this invention, the fabric $a$ is arranged with the axes of the coils lying across the cover $b$ from edge to edge, either at a right angle, or at a suitable acute angle thereto, the extremities of the coils being attached to inextensible beaded edges $c$ which may be formed from the coils by doubling them upon themselves, as indicated in Fig. 3. The number of the coils interwoven in the fabric, the diameter of the coils and the gage of wire used for the coils will be governed by the pressure and weight which the cover is intended to withstand, while the use of the fabric in the manner described imparts elasticity to the tire transversely but allows it to remain, after a certain increase in diameter has occurred, inextensible longitudinally.

In manufacturing the cover, the metal coil fabric is extended or stretched by suitable means (such as upon a mandrel) so as to represent the full extension or an extension slightly in excess of that which would take place under the normal internal pressure of the tire when in use, and while thus extended the plastic rubber is thoroughly worked into and through the fabric so as to fill all the interstices and provide a covering of rubber on both sides of the fabric. The layer of rubber or armoring for the tread is then added, and the whole is vulcanized while the fabric is still in its extended state. By the above method of manufacturing the covers, the rubber surrounding and permeating the fabric is never subjected to stretching and is therefore less liable to cutting, and there is little, if any, tendency for the fabric to become detached from the rubber. It will be seen that the axes of the coils lie across the cover from edge to edge. Conveniently these axes may be situated at such distances from each other that the coils will only firmly engage each other when the cover is expanded beyond the normal and the coils stretched in the direction of their axes. This stretching of the coils will naturally cause them to contract diametrically and thus will cause the coils to engage each other. It will be understood that two or more superposed layers of such metal fabric may be incorporated in the manufacture of the outer covers, as shown in Fig. 4, wherein the additional superposed layer is indicated by the reference letter $d$, to wholly or partly cover or protect the casing, and such layer may be employed with its coils arranged to cross those of the lower layer at a more or less acute angle.

Instead of the coils being interlaced with each other as shown in Figs. 1 and 2, they may be interwoven with coils $e$ running at right angles thereto or thereabout i. e. longitudinally of the cover, as shown in Figs. 5 and 6.

I claim:—

1. An outer cover for pneumatic tires having embedded therein an elastic restraining fabric formed of interlaced coils of spring wire, the axes of the coils lying across the cover from edge to edge and being situated at such distances from each other that the coils only firmly engage each other when the cover is expanded beyond the normal and the coils stretched in the direction of their axes.

2. An outer cover for pneumatic tires having embedded therein an elastic metal fabric which is stretched to an extent approximately equivalent to the tension of the cover when the tire is fully expanded.

3. An outer cover for pneumatic tires having embedded therein an elastic metal fabric formed of interlaced coils of spring wire, stretched to an extent approximately equivalent to the tension of the cover when the tire is fully expanded.

4. An outer cover for pneumatic tires having embedded therein an elastic restraining fabric formed of interlaced coils of spring wire, the ends of which are doubled upon themselves to provide such fabric with inextensible longitudinal edges, said fabric being stretched to an extent approximately equivalent to the tension of the cover when the tire is fully expanded.

5. An outer tire cover comprising an elastic metal restraining fabric composed of interlaced coils of spring wire stretched to an extent approximately equivalent to the tension of the cover when the tire is fully expanded, and a mass of plastic rubber worked thoroughly into and through the stretched fabric and vulcanized while the said fabric is thus stretched.

In testimony whereof I have hereunto set my hand in presence of two subscribing witnesses.

ERNEST HENRY JONES.

Witnesses:
  GEORGE C. DOWNING,
  WALTER I. SKERTEN.